(12) United States Patent
Villain et al.

(10) Patent No.: US 6,563,715 B2
(45) Date of Patent: May 13, 2003

(54) DEVICE FOR INSERTING AND RETAINING A MICROCHIP CARD

(75) Inventors: Jean-Christophe Villain, Colombes (FR); Bertrand Cupif, Antony (FR); Claire Guillon, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/054,959

(22) Filed: Jan. 25, 2002

(65) Prior Publication Data

US 2002/0109976 A1 Aug. 15, 2002

(30) Foreign Application Priority Data

Feb. 12, 2001 (FR) .............................. 01 01864

(51) Int. Cl.⁷ ................................ H05K 9/00
(52) U.S. Cl. ....................... 361/800; 361/816; 361/818; 361/801; 174/35 R
(58) Field of Search ................. 361/752, 801, 361/802, 803, 816, 818, 814, 679, 800; 455/90, 575, 347; 174/35 R

(56) References Cited

U.S. PATENT DOCUMENTS

| | | | |
|---|---|---|---|
| 5,336,877 A | * 8/1994 | Raab et al. | 235/475 |
| 5,699,406 A | * 12/1997 | Liikanen et al. | 379/58 |
| 5,718,609 A | * 2/1998 | Braun et al. | 439/630 |
| 5,831,256 A | * 11/1998 | De Larminat et al. | 235/486 |
| 5,837,984 A | * 11/1998 | Bleier et al. | 235/441 |
| 5,894,597 A | * 4/1999 | Schwartz et al. | 455/558 |
| 6,035,216 A | * 3/2000 | Cheng et al. | 455/558 |
| 6,070,802 A | * 6/2000 | Yi | 235/475 |
| 6,102,743 A | * 8/2000 | Haffenden et al. | 439/630 |
| 6,175,505 B1 | * 1/2001 | Cheng et al. | 361/752 |
| 6,226,189 B1 | * 5/2001 | Haffenden et al. | 361/814 |

FOREIGN PATENT DOCUMENTS

| | | |
|---|---|---|
| EP | 0 893 777 A2 | 1/1999 |
| EP | 0 982 679 A1 | 3/2000 |
| GB | 2 329 055 A | 3/1999 |

* cited by examiner

*Primary Examiner*—David Martin
*Assistant Examiner*—Dameon E. Levi
(74) *Attorney, Agent, or Firm*—Sughrue Mion, PLLC

(57) ABSTRACT

The invention relates to microchip card readers in mobile telephones. A device for inserting and retaining a microchip card consists in a partial depression of the upper portion of the shielding cover, with the exception of a tongue. The depression has an opening for the spring contacts to pass through. The distance between the plane of the spring contacts and the tongue allows the microchip card to pass through it in order to insert it and retain it in the depression.

9 Claims, 2 Drawing Sheets

DEVICE FOR INSERTING AND RETAINING A MICROCHIP CARD

CROSS-REFERENCE TO RELATED APPLICATIONS

This application is based on French Patent Application No. 01 01 864 filed Feb. 12, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to microchip cards used in mobile telephones and more particularly to a device for use in mobile telephones for inserting a microchip card and holding it in contact with output terminals of a microchip card reader.

2. Description of the Prior Art

A mobile telephone usually has three portions:

a central portion which contains the electronic circuits, a front portion that supports the screen and the keys, and a rear portion that supports the battery.

The rear portion is removable and removing it uncovers the rear face of the central portion, which features various mobile contacts, some of which connect the battery and others of which connect a microchip card to a reader in the central portion.

Because the microchip card is also removable, the central portion includes a device for inserting and retaining the microchip card so that its contacts, of which there are six, abut against the mobile contacts of the microchip card reader.

In the prior art, the device for inserting and retaining the microchip card takes various forms, which have the major defect of being complicated by virtue of relying on pivoting and longitudinal displacement mechanisms that are costly to fabricate and assemble and fragile in use.

Also, some prior art devices have a thickness which increases commensurately that of the mobile telephone and occupy a large area of the printed circuit card supporting the electronic circuits.

One object of the present invention is therefore to provide a simple, rugged, inexpensive and compact device for inserting a microchip card into its reader and retaining it there.

The above object is achieved by using the shielding cage of the electronic circuit, which is configured for inserting and retaining the microchip card.

SUMMARY OF THE INVENTION

The invention provides a device for inserting and retaining a microchip card on a printed circuit card protected by shielding which includes means for inserting and retaining the microchip card.

To be more precise the invention provides a device for inserting a microchip card into and retaining the microchip card in a microchip card reader incorporating spring contacts adapted to cooperate with contact surfaces on the microchip card, electronic circuits of the reader being enclosed in radio frequency shielding in the form of a cover, which device consists in a partial depression of the upper portion of the shielding cover, with the exception of a tongue, the depression having an opening for the spring contacts to pass through, the distance between the plane of the spring contacts and the tongue allowing the microchip card to pass through it in order to insert it and retain it in the depression.

The depression extends to the periphery of the shielding cover to allow lateral insertion of the microchip card under the tongue.

The spring contacts are on either side of the tongue.

The depression incorporates a polarizer to prevent incorrect insertion of the microchip card.

The device is made by stamping and/or cutting a metal blank.

Other features and advantages of the present invention will become apparent on reading the following description, which is given with reference to the accompanying drawings, of one particular embodiment of the invention.

DETAILED DESCRIPTION OF THE PREFERRED EMBODIMENT

As indicated in the preamble, a mobile telephone has a central portion that contains the electronic circuits on a printed circuit card 10. The electronic circuits can be divided into three categories:

a battery charging circuit, a circuit for sending/receiving radio frequency signals, and a circuit for processing digital signals.

Figure 1:
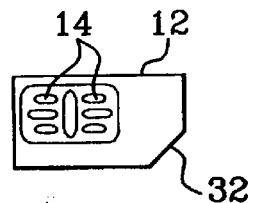
FIG. 1 shows a SIM microchip card for use in a mobile telephone.
Figure 2:
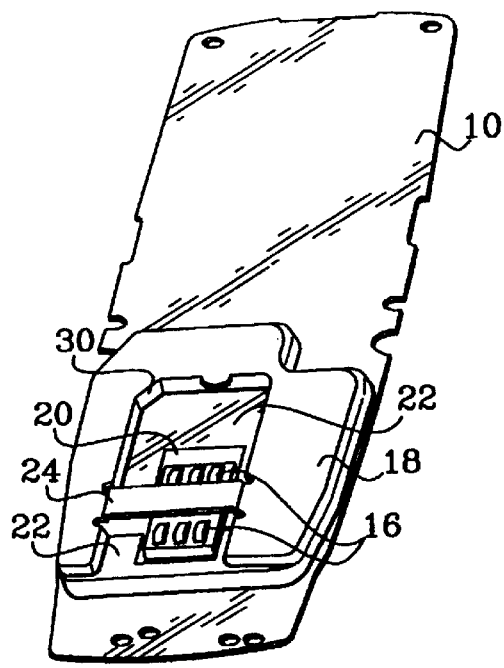
FIG. 2 is a perspective view of an electronic circuit support equipped with a device in accordance with the invention for inserting and retaining a microchip card.

For these electronic circuits to be able to operate, in particular to set up a telephone connection, they must read information contained in an electronic circuit inserted when the telephone is purchased. This indispensable electronic circuit takes the form of an integrated circuit, referred to as a microchip, which is carried by a card 12 (FIG. 1). The microchip has galvanic contacts 14 (usually six contacts) which cooperate with galvanic contacts 16 (FIG. 2) of a reader 28 which is part of the circuit for processing digital signals.

The invention relates to the device for inserting the microchip card 12 and retaining it in position relative to the contacts 16 of the reader 28.

Electronic circuits are known to emit radio frequency signals that interfere with the operation of nearby electronic circuits. Consequently, they are protected from each other by shielding which provides a Faraday cage preventing the passage of radio frequency interference signals.

The shielding takes the form of one or more metal covers covering the electronic circuits. The figures show only the shielding covering the digital processor electronic circuits, which include the microchip card reader 28, whose mobile galvanic contacts 16 are shown. The shielding cover 18 is welded to the printed circuit 10 by at its bottom periphery.

In accordance with, the invention, the shielding cover 18 is conformed to provide the device for inserting the microchip card 12 and retaining it relative to the contacts 16 of the card reader.

To this end, at the location of the contacts 18 of the reader, the top part of the cover 18 has an opening rough which the contacts 18 pass and a partial depression which reduces the height of the top surface of the cover except for a tongue 24 situated between the two series of three contacts 16.

Accordingly, the perimeter of the opening 20 surrounds the area of the contacts 16, which project above the top plane of the cover in the depression.

The depth of the depression 22 and the height of the mobile contact 16 are such that there is a passage 26 of sufficient height between the tongue 24 and the mobile contacts 16 to allow longitudinal movement of the card 12.

The periphery of the depression 22 is conformed for correct fitting of the card 12, in particular by providing a corner 30 whose shape cooperates with the corner 32 of the card 12.

Figure 4:
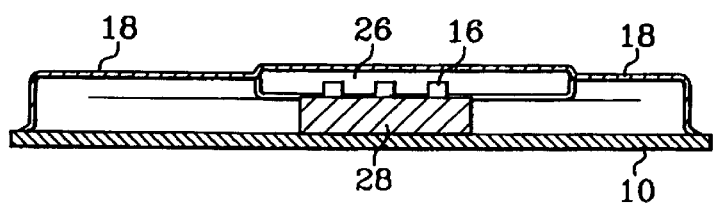
FIG. 4 is a view to a larger scale and in section taken along the line IV—IV in FIG. 3.
Figure 5:
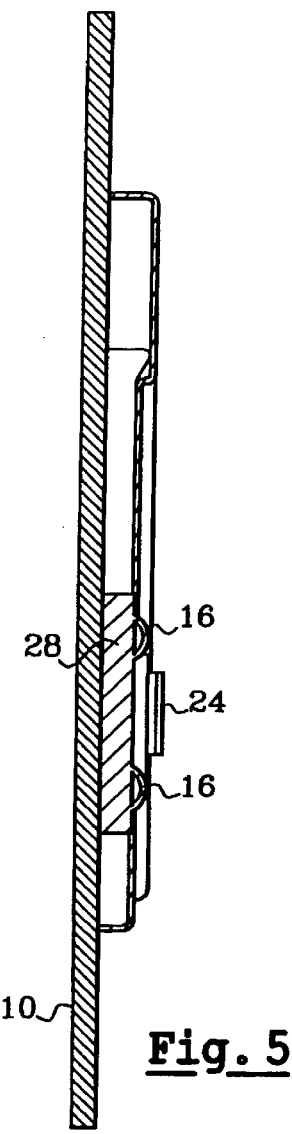
FIG. 5 is a view to a larger scale and in section taken along the line V—V in FIG. 3.

As shown in FIGS. 4 and 5, the tongue 24 is in a plane that is situated slightly above the top portion of the shielding cover 18. The pressure force exerted by the mobile spring contacts 16 holds the card 12 in place against the tongue 24.

The position of the opening 20 relative to the depression 22 is conditioned by that of the contacts 14 of the card relative to the card itself and is defined by a standard.

The depression 22 extends to the periphery of the shielding cover 18 to allow the card 12 to be inserted into the passage 26 under the tongue 24.

Figure 6:
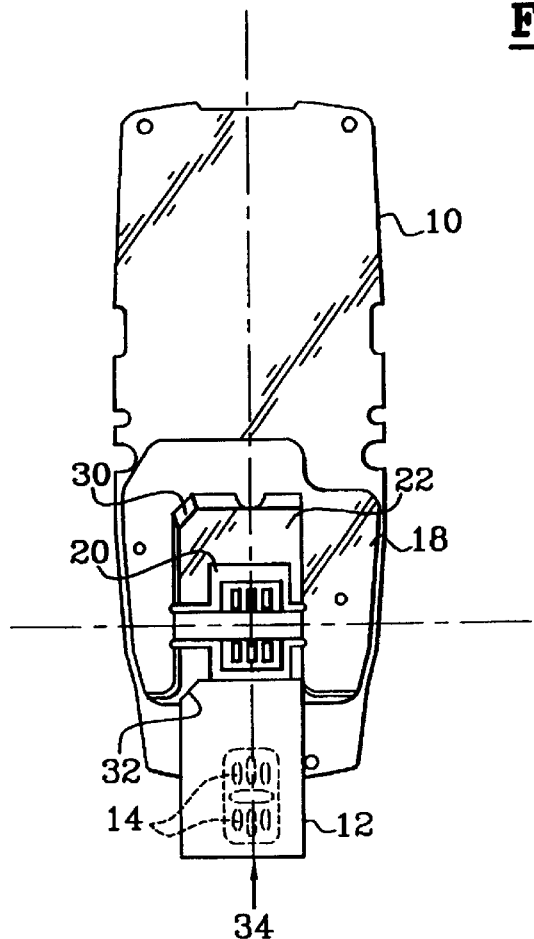
FIG. 6 is a view similar to FIG. 3 showing the microchip card positioned for insertion into the device according to the invention.
Figure 3:
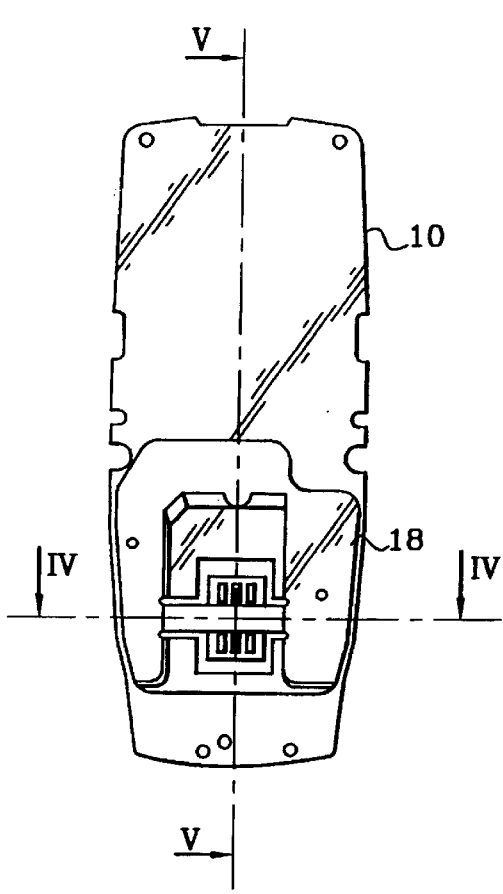
FIG. 3 shows the support shown in FIG. 2.

FIG. 6 shows the insertion of the card 12 under the tongue 24 so that it fits into the depression 22, an arrow 34 indicating the direction of insertion of the card 12.

Because the microchip card is flexible, it can be inserted from the other side, i.e. that of the corner 30, and in this case an abutment (not shown) is provided on the other side.

The device according to the invention can be implemented using various technologies, for example by stamping or cutting a metal plate or by molding a plastics material and metalizing the resulting plastics material part.

The above description demonstrates the simplicity of the device according to the invention, its ruggedness, since there are no pivoting parts, how easy it is to insert, its compact overall size and its low cost.

The invention has been described in an application to a mobile telephone, but applies to any device using a microchip card reader incorporating shielding.

There is claimed:

1. A device for inserting and retaining a microchip card on a printed circuit card, said device comprising:

shielding means for protecting at least said printed circuit card, a microchip card reader, said shielding means comprising:

means for inserting and retaining said microchip card in a microchip card reader, said means for inserting and retaining said microchip card having a tongue, wherein said microchip card reader incorporates spring contacts adapted to cooperate with contact surfaces on said microchip card, wherein electronic circuits of said microchip card reader are enclosed in radio frequency shielding in the form of said shielding, and wherein said device comprises a partial depression of an upper portion of said shielding cover, except the tongue is not depressed, said partial depression having an opening between the plane of said spring contacts and said tongue for said spring contacts and said microchip card to pass through.

2. The device claimed in claim 1, wherein said partial depression extends to the periphery of said shielding cover to allow lateral insertion of said microchip card under said tongue.

3. The device claimed in claim 1 wherein said spring contacts are on either side of said tongue.

4. The device claimed in claim 1 wherein said depression incorporates a polarizer which cooperates with a polarizer of said microchip card to prevent incorrect insertion of said card.

5. The device claimed in claim 1, wherein said device is made from a stamped metal blank.

6. The device claimed in claim 1, wherein said device is formed of a metalized plastics material part.

7. A terminal, said terminal comprising a device for inserting and retaining a microchip card, said device comprising:

shielding means for protecting at least said printed circuit card;

a microchip card reader adapted to receive a microchip card adapted to be retained on a printed circuit card of said terminal;

said shielding means comprising:

means for inserting and retaining said microchip card in said microchip card reader, said means for inserting and retaining said microchip card having a tongue, wherein said microchip card reader has spring contacts adapted to cooperate with contact surfaces on said microchip card, wherein electronic circuits of said microchip card reader are enclosed in radio frequency shielding in the form of said shielding, and wherein said device comprises a partial depression of an upper portion of said shielding cover, except the tongue is not depressed, said depression having an opening between the plane of said spring contacts and said tongue for said spring contacts and said microchip card to pass through.

8. A device for inserting and retaining a microchip card on a printed circuit card, said device comprising shielding means which includes means for inserting and retaining said microchip card, wherein the shielding means is rigidly fixed to said printed circuit card and the shielding means is immovable with respect to said printed circuit card.

9. A terminal including a microchip card reader adapted to receive a microchip card adapted to be retained on a printed circuit card of said terminal, said printed circuit card being protected by shielding, which comprises means for inserting and retaining said microchip card, said shielding being rigidly fixed to said printed circuit card and immovable with respect to said printed circuit card.

* * * * *